(12) United States Patent
Weldemariam et al.

(10) Patent No.: US 10,534,362 B2
(45) Date of Patent: Jan. 14, 2020

(54) DRONE CAPTCHA

(71) Applicant: International Business Machines Corporation, Armonk, NY (US)

(72) Inventors: Komminist Weldemariam, Nairobi (KE); Anca Sailer, Scarsdale, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/679,558

(22) Filed: Aug. 17, 2017

(65) Prior Publication Data

US 2019/0056726 A1    Feb. 21, 2019

(51) Int. Cl.
| | | |
|---|---|---|
| *G05D 1/10* | (2006.01) | |
| *G05D 1/00* | (2006.01) | |
| *G08G 5/00* | (2006.01) | |
| *B64C 39/02* | (2006.01) | |
| *G08G 5/04* | (2006.01) | |
| *G10L 15/22* | (2006.01) | |
| *G06N 20/00* | (2019.01) | |
| *G08B 17/00* | (2006.01) | |

(52) U.S. Cl.
CPC .......... *G05D 1/0022* (2013.01); *B64C 39/024* (2013.01); *G06N 20/00* (2019.01); *G08G 5/0034* (2013.01); *G08G 5/0069* (2013.01); *G08G 5/045* (2013.01); *G10L 15/22* (2013.01); *B64C 2201/126* (2013.01); *B64C 2201/128* (2013.01); *B64C 2201/146* (2013.01)

(58) Field of Classification Search
CPC .......... G06G 10/08; G05D 1/00; G05B 17/00; G01S 19/48; B64C 39/04; G08G 5/00
USPC ............................................................ 701/2
See application file for complete search history.

(56) References Cited

U.S. PATENT DOCUMENTS

| | | | |
|---|---|---|---|
| 2014/0254896 A1* | 9/2014 | Zhou ..................... | B25J 9/0006 382/124 |
| 2016/0117934 A1* | 4/2016 | Soundararajan ......... | G01S 1/44 701/3 |
| 2016/0357183 A1* | 12/2016 | Shaw ................... | G05D 1/0027 |
| 2017/0011340 A1* | 1/2017 | Gabbai ............. | G06Q 10/0836 |
| 2017/0090484 A1* | 3/2017 | Obaidi .................. | B64C 39/024 |
| 2017/0129603 A1* | 5/2017 | Raptopoulos ......... | B64C 39/024 |
| 2017/0278405 A1* | 9/2017 | Yakan ................... | G08G 5/006 |
| 2017/0323235 A1* | 11/2017 | Johnston .......... | G06Q 10/06311 |
| 2018/0074499 A1* | 3/2018 | Cantrell ............... | B64C 39/024 |
| 2018/0137454 A1* | 5/2018 | Kulkarni ............... | B64C 39/024 |

* cited by examiner

*Primary Examiner* — Tan Q Nguyen
(74) *Attorney, Agent, or Firm* — Scully, Scott, Murphy & Presser, P.C.; Eyal Gilboa

(57) ABSTRACT

A request to determine a drone's capability may be received. A request type of the request and service context may be determined. A challenge may be generated based on the request type and the service context. The challenge may be presented to a drone and causing the drone to attempt the challenge. Information may be received from the drone, the information indicating the drone's response to the challenge attempted by the drone. The drone may be controlled to perform a given task or not perform the given task, based on the information.

18 Claims, 5 Drawing Sheets

DRONE CAPTCHA

FIELD

The present application relates generally to aerial vehicles such as unmanned aerial vehicles (UAVs) or remotely controlled aerial vehicles.

BACKGROUND

Drones are small, lightweight unmanned aerial vehicles that are operated either autonomously by onboard computers or by a human operator via remote control. For autonomous flight, drones contain a global positioning system (GPS) device that guides them along a sequence of waypoints and enables them to return to their launching point. Drones may carry payloads, such as sensor packages, cameras, or other types of small objects. The flight time of a drone is a function of its weight, battery capacity, and operating environment such as wind. Flight times generally range from 10 to 15 minutes per battery for helicopter drones and 30 to 50 minutes for fixed-wing drones.

Drones are becoming increasingly popular in the hobbyist/consumer market. Interest in the commercial use of drones is also increasing, as new regulations in the U.S. are being crafted to enable commercial drone flights. Industries that drones may impact may include agriculture, cinematography, mining, oil and gas, emergency response, and law enforcement.

BRIEF SUMMARY

A system and method are presented that test a drone's capacity. The system, in one aspect, may include a hardware processor and a memory device coupled to the hardware processor. The hardware processor may be operable to receive a request to determine a drone's capability. The hardware processor may be further operable to determine a request type of the request and service context. The hardware processor may be further operable to generate a challenge based on the request type and the service context and store the generated challenge in the memory device. The hardware processor may be further operable to present the challenge to a drone and cause the drone to attempt the challenge. The hardware processor may be further operable to receive information from the drone, the information indicating the drone's response to the challenge attempted by the drone. The hardware processor may be further operable to control the drone to perform a given task or not to perform the given task, based on the information.

A method of determining a drone's capacity, in one aspect, may include receiving a request to determine a drone's capability. The method may also include determining a request type of the request and service context. The method may further include generating a challenge based on the request type and the service context. The method may also include presenting the challenge to a drone and causing the drone to attempt the challenge. The method may further include receiving information from the drone, the information indicating the drone's response to the challenge attempted by the drone. The method may also include controlling the drone to perform a given task or not to perform the given task, based on the information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
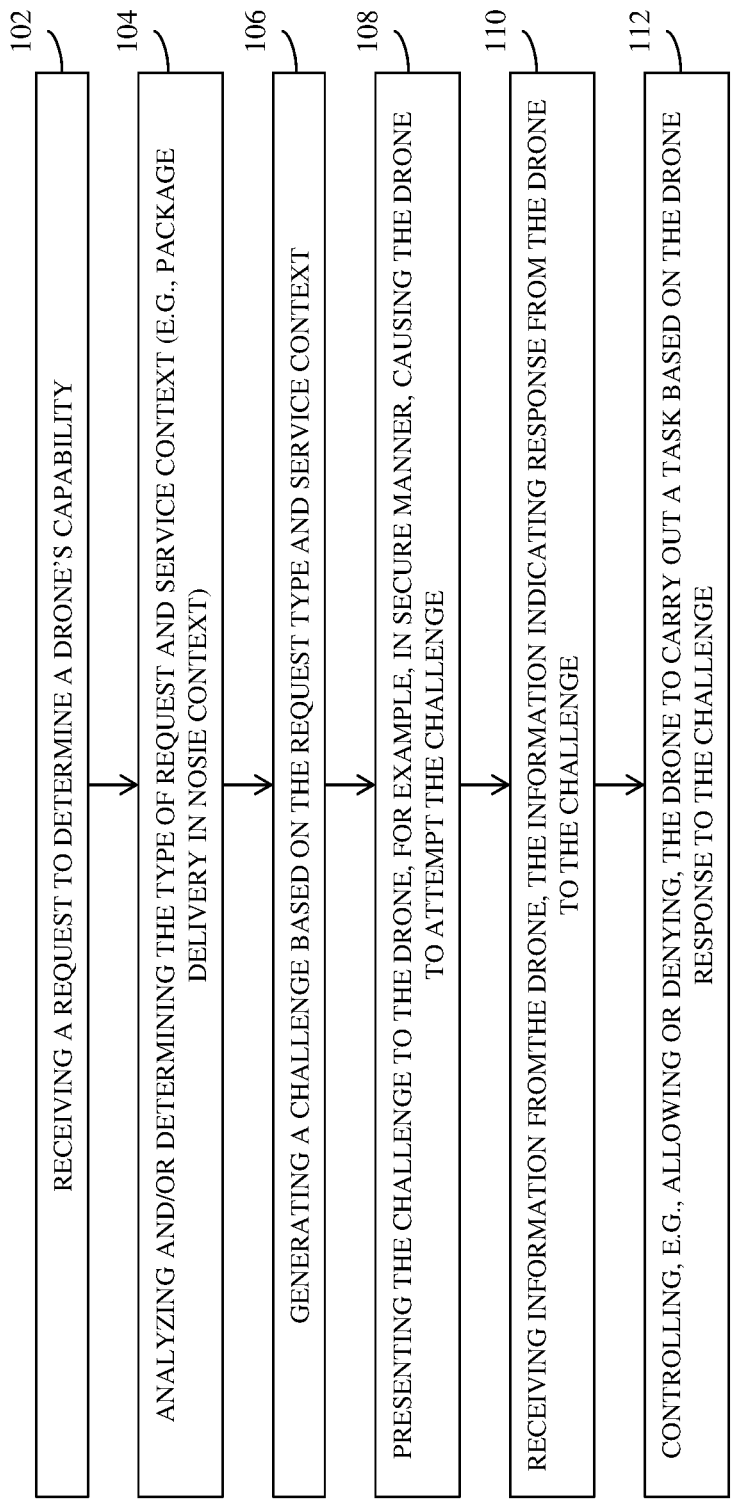
FIG. 1 is a flow diagram illustrating a method of testing a drone in one embodiment.

Drones have different capabilities. Some drones may be more effective or safe at performing a task than others. A method, system and techniques are disclosed for providing a drone (also referred to as a UAV) with a "drone CAPTCHA," a challenge or test, and receive information from the drone that it has attempted to respond to the drone CAPTCHA. Based on the information received from the drone, the drone is permitted and/or facilitated to carry out a response. CAPTCHA is a type of challenge-response test, traditionally used in computing to determine whether or not the user is human. CAPTCHA is a backronym (back or reverse acronym) for "Completely Automated Public Turing test to tell Computers and Humans Apart." CAPTCHA is also referred to as a program that protects websites against bots (automated computer programs or robots) by generating and grading tests that humans can pass but the bots currently cannot. In the present disclosure, the term CAPTCHA is used in an extended fashion and is used in relation to a test or testing of whether a drone has sufficient, safe, or appropriate capabilities for performing its assigned function or functions.

A trigger that initiates generating and transmission of a CAPTCHA challenge may be based on a request by the drone, for example, to pick up a package, to perform an inspection inside or outside a building. The trigger may be also based on a location of a drone, a speed of a drone. The trigger may be also based on receiving of an order, for example, to deliver goods based on purchase order on a web site, inspecting request from an online inspection, service, and/or others. News feeds may trigger the CAPTCHA and/or shape the CAPTCHA content. For example, information such as a current news item that is associated with a particular security breach or safety risk involving a drone feature may shape the drone CAPTCHA.

Receiving information from the drone may be based on information related to: performing a flight maneuver, for example, a quick up, down, back, forth, side, side maneuver; demonstrating speech recognition ability of a desired level, for example, responding to several verbal commands; demonstrating a collision avoidance ability, navigation ability, imaging ability and image resolution, engine horsepower, stabilization software and/or abilities when carrying a load, access to people or those in need, noise made at different engines speeds, demonstrating safe handling and/or dropping of object using sample object such as a package. Other tests may be performed, such as flying in a figure-8 pattern at a speed. Speech recognition may be performed with a defined level of noise to test if the recognition is robust (e.g., meet a desired or defined threshold level) in a noisy environment.

Based on the information received from the drone, the drone is permitted and/or facilitated to carry out a response. For instance, the drone may be instructed to pick up a package, which may be perishable, a biohazard, a fragile item, for example; fly to a location, providing the drone with further instructions, or any other actions that the drone may be capable of performing, for example, based on the information.

Drones may be made available as a called or requested service to transport goods. In that aspect, for example, the method and system described herein may provide a mechanism to ensure the capability of the drone so that the service can be performed and used with a degree of user confidence.

FIG. 1 is a flow diagram illustrating a method of testing a drone in one embodiment. At 102, a request is received to determine (e.g., test or verify) a drone's capability. The request in one aspect may originate from an entity that is considering using the drone to perform a task. The request may be triggered automatically, for example, based on context.

At 104, the type of request and service context is determined based on the received request. For example, a drone CAPTCHA system in one embodiment receives a request for service (e.g., in the form of an order) from a user or from another system-of-engagement (e.g., via mobile application). The order may contain details such as the type of the goods, services, location (i.e., delivering a package to a destination), and other user-specified conditions specific to the order (e.g., risk and/or sensitivity of the goods, delivery time such shorter Expected Time of Arrival, ETA, and/or other conditions). In one embodiment, the system maintains a database of services and related types of tests according to the requested service performed by the drone as a proof of the drone capability to carry out the requested service. The database in one embodiment is further linked with a growing knowledge graph according to previously carried out services, tests performed, and/or other information. The system may fetch context and type of the service from the database using the requested order payload. For instance, text analytics techniques may be employed and by matching the information in the order payload with the information from the database, the type of service and context may be determined. Other techniques may be employed to determine type of service and context associated with the requested order payload from the database. Types may include, for example, delivering a package to a destination, surveying an area by taking photos, videos or by another sensing device, spraying an area, and/or others. In one embodiment, the context may be determined using one or more trained machine learning algorithms based on plurality of input data (e.g., order, request payload, database, knowledge graph, and/or other input data). Service context may include current conditions, for instance, related to the drone and the request, such as weather, location, time, and/or others. For instance, the CAPTCHA trigger and test (e.g., determining when to trigger a challenge for testing the drone and send the challenge to the drone to respond to by performing an action in the challenge) may be context dependent. For example, the trigger and test may be based on weather, wind, rain, time of the day (for example, nighttime or daytime), risk level, drone's service type, and/or another context.

At 106, a challenge may be generated or retrieved based on the request type and service context. The challenges (also referred to as challenge CAPTCHAs) may be stored in a repository and selected as needed. In one embodiment, the system and/or method (also referred to as the drone CAPTCHA) may implement a personalized trigger and test generator that may use the drone's historical reactions and responses. Such test generator module may take into consideration the destination location context (for example, noisy location that exceeds a defined threshold noise level, large crowd presence that exceeds a defined threshold number of people in a crowd setting, and/or other context) so that the drone's capabilities are tested appropriately. For example, if the destination location is expected to be noisy or exceed a defined noise level or threshold, the test generator in one embodiment may generate a challenge such as asking the drone to identify a particular voice command from a set of commands with a level of distortions to test the drone's audio detection capability. In one aspect, the challenges are those that may be performed according to the type and context of the requested service by the end user. The type and context of the service may be time sensitive. For example, testing the drone's capability on how quickly (e.g., within a short span of time, for example, few seconds or minutes) to navigate in hazardous and/or difficult condition (e.g., delivering on noisy location).

At 108, the challenge is transmitted to the drone, for example, in secure manner. The sending of the challenge causes the drone to attempt the challenge.

As an example, consider that a drone is about to perform a task. The system and/or method in one embodiment presents the drone with a test or puzzle. For instance, the system and/or method in one embodiment may transmit an automated signal that asks the drone to fly in a specified pattern, test its voice recognition system and/or its collision avoidance system may be tested. Other examples of tests may include but are not limited to, any one or more of imaging abilities and resolution, infrared (IR) camera tests, the drone's ability to safely drop a package, and/or others. Other systems can be tested such as thermal camera abilities, video camera abilities, and/or or a multispectral camera ability. For example, dome drones may need properly functioning hyperspectral cameras, designed specifically for use on unmanned aerial vehicles/systems (UAV/UAS), or remotely operated vehicles (ROV). For instance, drone-supported multispectral imaging can help monitor crops and plants.

Figure 3A:
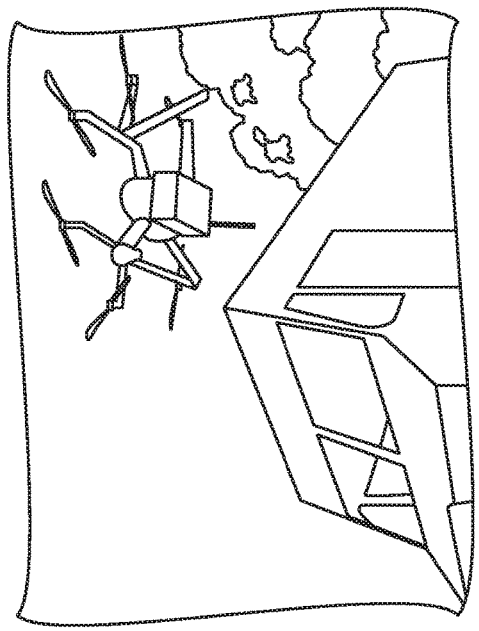
FIG. 3A shows an example drone in one embodiment.
Figure 3B:
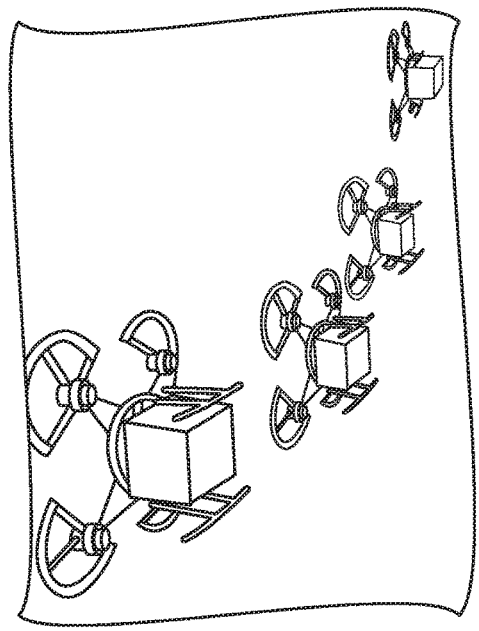
FIG. 3B shows an example of a drone carrying a package in one embodiment.
Figure 3C:
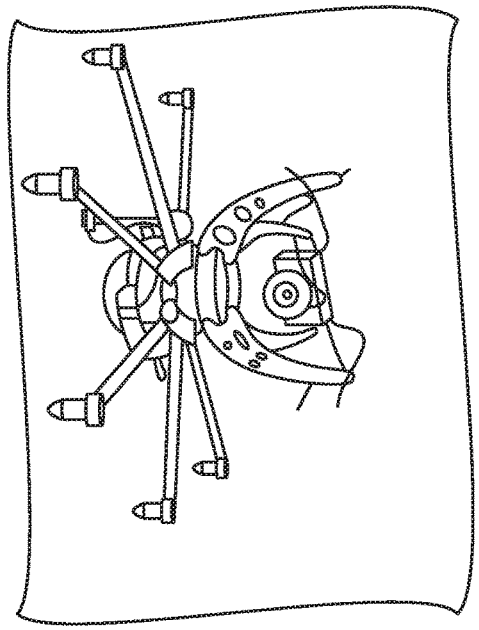
FIG. 3C illustrates a challenge presented to a drone to fly in a pattern in one embodiment.

FIG. 3A shows an example drone in one embodiment. FIG. 3B shows an example of a drone carrying a package in one embodiment. FIG. 3C illustrates a challenge presented to a drone to fly in a pattern, for instance, to test the drone for its navigation capability, in one embodiment.

Figure 3D:
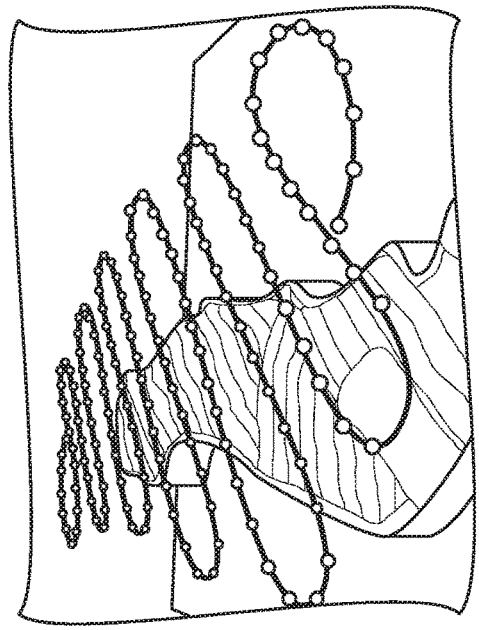
FIG. 3D illustrates a drone swarm in one embodiment.

In one aspect, the system and/or method of the present disclosure may be applied to more than one drone, for example, a drone swarm. Different drones in a swarm may play different roles and also have different positions in a hierarchy of control (for example, master, slave). Thus, different CAPTCHA challenges may be deployed to different drones in a swarm based on this role and hierarchy. FIG. 3D illustrates a drone swarm in one embodiment.

Referring to FIG. 1, at 110, information indicating a response to the challenge is received from the drone. For example, the system has detected the need to test the drone's audio detection capability. The corresponding a set of voice commands with defined levels of distortions has been generated by the system and the drone is tasked to identify a particular voice command from set of voice commands. After the drone has attempted its challenge, it uses its audio output to communicate the result of the attempt (i.e., a response to the challenge) with a degree of accuracy. For instance, if the drone is located within a distance of the system for the system to be able to listen to the drone, the drone may output the recognized speech. As another example, the drone may communicate a spoken command or speech via wireless communication.

In one aspect, a drone may receive a score or a grade based on the received information (the drone's response to the challenge). In one aspect, the grade or score that a drone receives for a CAPTCHA response may be used to deploy drones to different tasks, in real-time. Thus, for example, a drone with an "A" rating may be deployed to pick up a fragile object. As another example, a drone with a "C" rating may be considered for a package of lesser value and risk.

Figure 2:
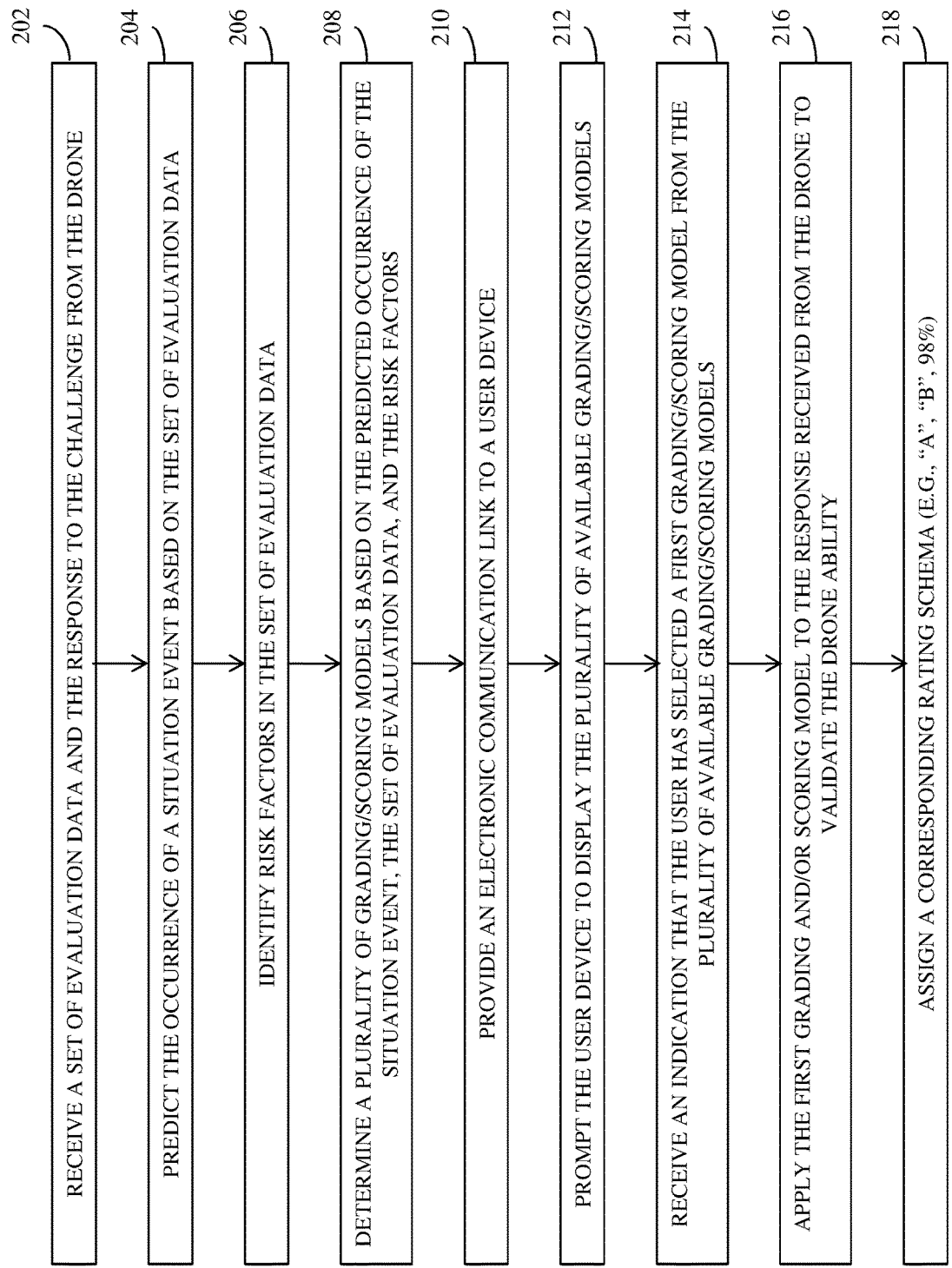
FIG. 2 is a flow diagram illustrating a method of scoring and/or grading the drone response to a challenge in one embodiment.

FIG. 2 is a flow diagram illustrating a method of scoring and/or grading the drone response to a CAPTCHA challenge in one embodiment. At 202, a set of evaluation data is received. For example, user defined criteria with type grading schema such letter schema, numeric schema, or another and the response to the challenge from the drone may be received.

Additionally, the process may include block 204, wherein the system predicts the occurrence of a situation event based on the first set of evaluation data. As used herein, a "situation event" may include any contextual factor that influences the scoring and/or grading algorithms such that the drone response to a CAPTCHA challenge may be determined. These situational events may be environmental, location specific, or temporal in nature. Examples of situational events may include the situation of sensors, how fast the drone can go, weather information and data, location or velocity of other drone in a given vicinity, and the like. The system may predict the occurrence of a situational event by identifying a change in the evaluation data associated with drone's response to historical challenges, a change associated with weather information, a navigation route directed to a destination, user supplied rules associated to a service, and the like. For example, the system may monitor weather pattern.

In some embodiments, the process may further include block 206, wherein the system identifies risk factors in the set of evaluation data and historical response to CAPTCHA challenges. As used herein, "risk factors" are a given task the drone is to perform, the service the drone to provide, risk and value associated with goods to be delivered, risk associated to a particular location (e.g., too noisy location, large crowd presence, and/or others), and the like that may be taken into account when determining how a drone could, or should, perform their tasks.

At 208, a plurality of grading and/or scoring models is determined based on the predicted occurrence of the situation event, the set of evaluation data, and the risk factors. In some embodiments, the process may include block 208, wherein the system determines a plurality of grading and/or scoring models based on the predicted occurrence of the situation event, the set of evaluation data, and the risk factors. As used herein, "grading and/or scoring models" are evaluating deployments of a drone for allowing the drone to different tasks, and the like of user requests. The grading and/or scoring models are based on a plurality of machine learning algorithms (for example, algorithms such as visual analytics, deep learning, and statistical methods) trained using plurality of historical input data from one or more data sources (e.g., various voice data, image samples, crowd-sourced location data, historical CAPTCHA challenges, responses, user supplied data). A single grading/scoring model for CAPTCHA challenge may comprise a single capability of the drone, such as verifying/testing performing a flight maneuver (e.g., a quick up, down, back, forth, side, side movements). In some embodiments, a single grading/scoring model may comprise multiple components of a drone for a single capability, such as testing a flight maneuver (e.g., a quick up, down, back, forth, side, side movements), speech recognition ability of a defined level (e.g., responding to several verbal commands), and collision avoidance abilities, navigation abilities, imaging abilities (e.g., including image resolution), etc. In some embodiments, a single scoring model may comprise multiple components of a drone, wherein each drone component is associated with one or more functionalities or services to which the CAPTCHA challenges may be generated. In some embodiments, a single scoring model may comprise multiple components of a drone, wherein each drone component is associated with one or more functionalities or services.

In some embodiments, the process may include block 210, wherein the system provides an electronic communication link to a user computing device of the drone service requester. As used herein, a "user computing device" is an electronic computing device that may communicate other network system via the communication network (e.g., WiFi, Bluetooth, etc), and includes input and output mechanisms for such communication. For example, a user computing device may be a mobile phone device, a tablet, a smart watch or other wearable, and the like. In some embodiments, the output mechanism of the user computing device comprises a graphical user interface (GUI) for displaying information to the user (e.g., for selecting one of a grading or scoring model from available grading and/or scoring models). Similarly, in some embodiments, the input mechanism of the user computing device may comprise a touchscreen, a keypad, a mouse, microphone, or other input device capable of selecting or entering information into the user computing device such that the user computing device may transmit the input information to drone system, or to the CAPTCHA system via the network.

The process in FIG. 2 may include block 212, wherein the system prompts the user computing device to display the plurality of available available grading/scoring models. In some embodiments, the system may provide a list of available grading/scoring models to the user of drone service via a display on the user computing device. The display may include a description for each grading/scoring model, parameters in which each grading/scoring model being trained, algorithms with associated accuracy for each grading/scoring model, a rating scale/scheme (e.g., letter, percentage, numeric etc), and any requirements for the user to be aware of if they decide to select each grading/scoring model.

The system may further prompt the user computing device to display one or more questions regarding user specified requirements such as a user specified requirements may be risk factors, duration in the flight, specific characteristics of the goods to be delivered, and any other user supplied requirements. For example, the system may be able to provide an additional grading/scoring model if the drone service user provides information associated with one or more characteristic of the delivery goods that the user is desired to verify via additional CAPYCHA challenges to the drone performing capability upon selection of a desired grading/scoring model from the system. Upon receiving a response from the user, the system may re-determine the grading/scoring models to be displayed to the user. In some embodiments, the system may display grading/scoring models that may be customized by the user via the user computing device.

In some embodiments, the process of FIG. 2 may include block 214, wherein the system receives an indication that the drone service user has selected a grading/scoring model from the plurality of available grading/scoring models. In some embodiments, this indication is received at the user computing device, via the user computing device input, and communicated to the drone system, and/or CAPTCHA system via the communication network. In some embodiments, the system receives the drone service user selections via a secured communication link between the user computing device, drone system, and/or CAPTCHA system.

At 216, the first grading and/or scoring model indicated by the user device is applied to the response received from the drone. At 218, a corresponding rating scheme (e.g., "A", "B", 98%, etc) is assigned to the drone's response.

In one aspect, the historic grades and/or scores a drone received (for example, historical scores and context) over time may be analyzed to further inspect the drone capabilities. If a pattern is discovered such as a drone's grade continuing to drop in response to a challenge to identify a voice command in noisier situation in a destination location, the system may recommend capability improvement plan for the drone. In another aspect, the system and/or method may actuate an automatic capability improvement based on the plan, for example, by controlling the drone to fly to a docking station or another where drone retuning may be performed and automating a machine to perform the retuning or repairing.

In one aspect, the package itself may control or send the CAPTCHA challenge. For example, responsive to determining that the package is a fragile package, a signal may be sent based on that factor. In another aspect, a fragile package may includes a radio frequency identification (RFID) tag that suggests the CAPTCHA involve the drone flying in a figure-8 pattern or movement with a given level of stability, and this response (e.g., the drone performing the figure-8 movement) may be assessed by a remote camera.

In one aspect, a package may include an indication for the type of CAPTCHA challenge. For instance, the package may include an RFID tag that indicates required capability of a drone that should carry and deliver this package. Based on the information indicated in the RFID tag, the system and/or method may send a CAPTCHA challenge and receive a response from the drone.

At 112, the drone is controlled or instructed to carry out a function or to not perform a function based on the received information, that is, the drone's response to the challenge. For example, once the drone successfully satisfies the "Drone CAPTCHA" quick puzzle/challenge/test, the drone is then enabled or qualified for performing its actual function or task. For example, based on the drone successfully satisfying the requested challenge, for example, by the drone performing the challenge and responding with a satisfactory response (e.g., as determined by meeting a threshold level), the system and/or method in one embodiment, directs or controls the drone to perform a function or task. Examples of a task may include, but not limited to, one or more of: flying in an area, for example, to spray insecticide at a farm, or enter a factory; picking up a package, for example, valuable package, biohazard item, perishable item, risky, fragile item, and/or others; turning on its light indicator showing authorization level (for example, a green light on its body showing it is okay.

Communications between a CAPTCHA system and a drone may be performed via a wireless network, WiFi, short range radio communication facility such as Blutooth, and/or others. For instance, the controlling and/or sending of CAPTCH challenge and receiving responses from a drone can be performed via such communication network.

As described above, in one embodiment, challenges or tests may be context dependent, for example, based on local laws and regulations, weather, rain, nighttime/daytime, risk level, and/or destination context, and/or others. In one embodiment, as the drone flies, the drone may continually broadcast a signal indicating that it has passed the test. The signal may be in the form of an encrypted communication and may also include a drone ID (for example, a universally unique identifier (UUID), which may be a 128-bit number used to identify information in computer systems or the like). For example, during the first communication, the drone responds with UUID, and forthcoming communication payloads always include the UUID.

In one embodiment, the system and/or method may also include a capability to distinguish or determine malicious triggers and tests that may originate from a malicious or unauthorized source (CAPTCHA related sources). For instance, a drone's CAPTCHA trigger and test interpreter module, which may be a remote service or deployed as a Cloud service that can be accessed by a client device (e.g., drone application or app, user mobile application) via an application programming interface (API). This can be implemented using a standard secure communication protocol with a cloud-based identity registry system maintained in a specialized manner such as employing a blockchain controlled identity look-up service.

The system and/or method in one embodiment may discourage those drones that fail the challenge or does not provide a satisfactory response (for example, its performance does not pass the required performance threshold). The discouraging may simply be that the system provides no further instructions that the drone needs. In another aspect, the discouraging may include the system automatically closing a door to prevent the drone from leaving or accessing an area. For example, consider a large factory building with different regions or rooms. Access to such areas may be granted through various doors, apertures, and the like. For example, if a drone fails a drone CAPTCHA test, a door to an area may close, thus denying the drone access. A drone may also have designated compartments with doors depending on service given by the drone—e.g., a drone for transporting refrigerated goods. Such doors may only be opened once the drone has passed the CAPTCHA challenge. Yet in another aspect, the discouraging may include transmitting an alert to another drone to intercept the drone.

In one aspect, the monitoring of the drone may be done automatically via visual means, for example, cameras, electronic tracking systems, and/or by another device. A monitoring module may also utilize analysis of historical drone responses.

A drone may include multiple on-board software systems or subsystems that equip the drones with multiple capabilities. For example, drones may include advanced vision features enabling learning, detection and tracking abilities, interaction with objects, colors, faces, motion, glyphs, and Quick Response (QR) codes. The system and/or method in one embodiment may test all those capabilities. Software and systems may also involve locomotion, navigation, flying, speech and/or gesture recognition functionalities. Drone software may include task specification and understanding, feedback loops, data filtering, control, path finding, and locating. In some use cases, it may be necessary that the drone be fairly quiet while in operation, depending on what it flies over. The system and/or method in one embodiment may also test that capability. For example, propellers and/or motors produce noise. Different drones have different kinds of propellers with different noise characteristics. The system and/or method in one embodiment may measure noise with a microphone, and a CAPTCHA test generator may generate a challenge to test the drone with different noise characteristics, for example, including a voice command with a level of distortion that simulates noisy environment.

As another example, a drone may also employ ultrasound telemetry sensor (and echo analysis) and of a barometric sensor to deliver an absolute altitude value of the drone in a terrestrial system. The system and/or method in one embodiment may also test that capability. For example, the system and/or method in one embodiment may have validation means such as scoring or grading the drone, to determine if the drone can properly sense the presence and the configuration of an obstacle within the operating range of the telemetry sensor, and to determine if the drone can apply, if needed, a suitable corrective action. A corrective action may include actions such as the drone automatically increasing its standard safe distance from a possible detected object (estimated to be present with a defined confidence level), for example, from 2 feet to 6 feet. Another example of a corrective action may be to automatically change speed, for example, to reduce the speed to increase a degree of safety, or to increase speed, if the obstacle is deemed to be adversarial in nature. Another example of a corrective action may include switching to other sensors or employing different algorithms to improve the confidence that the drone is properly sensing, and can properly sense, the presence of an obstacle and the configuration of an obstacle. Yet another example of a corrective action may include automatically supplying or switching the sensor feed to a human or an artificial-intelligence agent (computer) so that the human or computer agent can provide a signal that changes the confidence levels.

Yet as another example, the CAPTCHA challenge may be used to determine if the drone can receive information and properly respond to one or more communication devices (e.g., Wireless, Cellular tower, WiFi, satellite, beacon device). The communication device, CAPTCHA system and drone can be configured in such a way to verify the drone's ability to respond to communications transmitted through or broadcasted by the communication devices. Communication signals, including access information associated with access to a restricted area, may be transmitted to the drone system. The drone system may receive one or more access parameters that need to be verified or tested how the drone responds to the signal (extracted from the one or more access parameters).

The system and/or method in one embodiment may be useful in global disaster response, among others. The CAPTCHA challenges may test for rapid detection, qualified assessment and monitoring of disasters and electronic triage of victims. The drones may also include modular sensing or medical aid solutions, along with delivery platforms such as disaster messaging formats and resources on client mobile phone applications or physically via remote operated vehicles (unmanned aerial sea or land systems) or targeted air delivery. In this example, the drone may be tested to determine how it can handle disaster response missions. The CAPTCHA challenge generated can be configured to generate such challenges.

Drone CAPTCHAs may involve tests for a drone's ability to securely deliver mail or a package of goods to a delivery destination. A drone may include electronic signature and/or payment capabilities. For instance, a drone may include a system or software deployed on it for allowing a recipient of a package or service to electronically sign receipt, for receiving electronically signed receipt verification documents, and/or performing payment transactions, for instance, by displaying a payment barcode encoding user payment information. Optionally, the payment and document verification may be implemented using blockchain-based technology.

Figure 4:
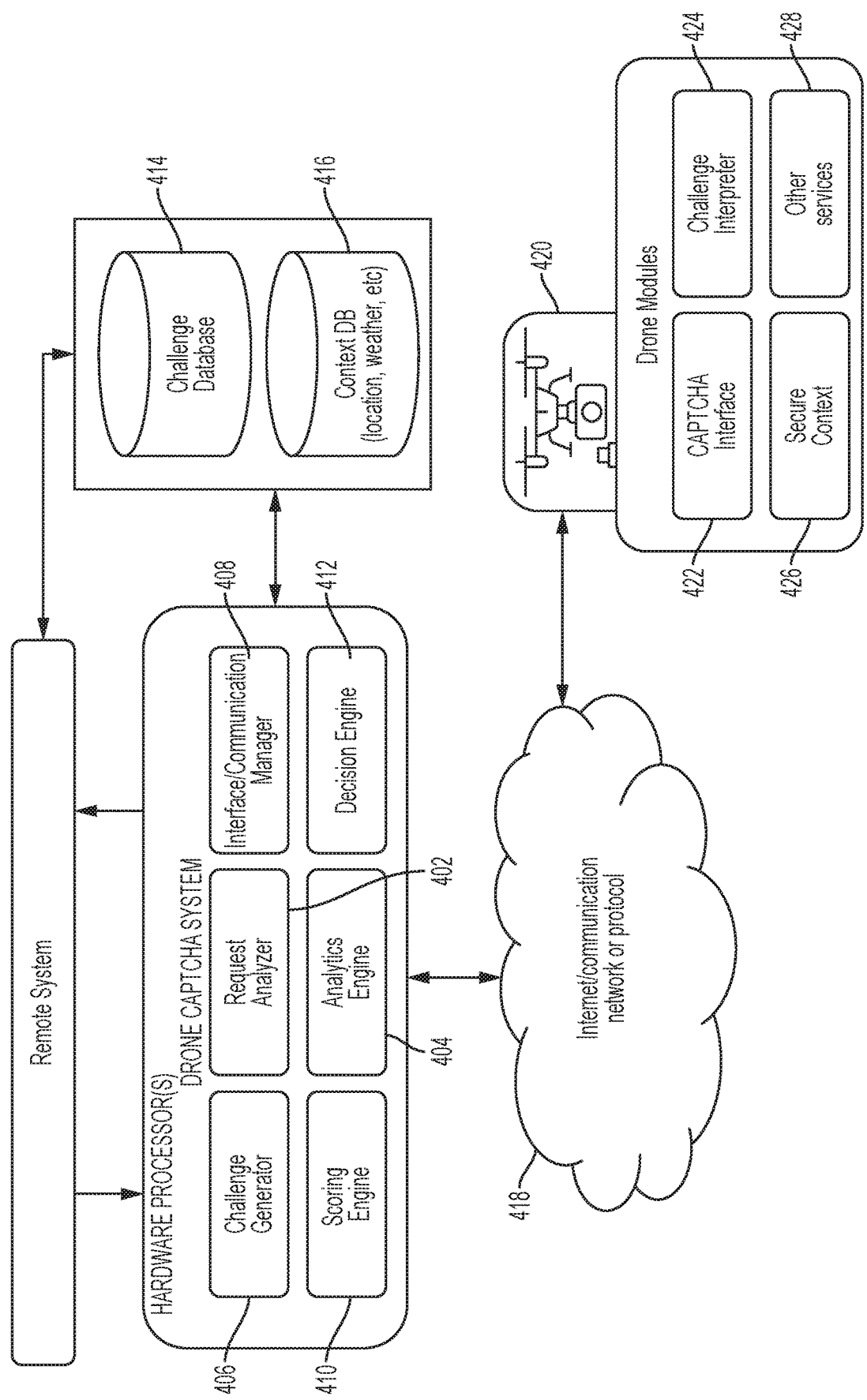
FIG. 4 is a diagram illustrating system architecture of a system in one embodiment.

FIG. 4 is a diagram illustrating system architecture of a system in one embodiment. A system that provides or generates a challenge to a drone, causing the drone to respond to the challenge by performing actions associated with the challenge, receives response information from the drone and permits (or facilitates) drone tasks, for example, as described above, is also referred to as a drone CAPTCHA system. A drone CAPTCHA system may communicate with other components of a remote system deployed on Cloud or on premise environment. For example, the CAPTCHA system may request the remote system to generate more complex challenges and expose to the drone (e.g., via API). A drone CAPTCHA system may include components or modules or functionalities that execute or is executed by one or more hardware processors. For instance, a request analyzer 402 may receive a request to initiate testing of a drone and receiving a response from the drone to determine its capability, determine the type of request. The request analyzer 402 may also determine the service context. A context database 416 may store context data such as location, weather, and other contextual information. Components of the system may store and retrieve data from the context database via an interface and/or communication manager module 408. As an example, the system receives a service (e.g., in the form of an order) from a user or from another system-of-engagement (e.g., via mobile application). The order contains order details such as the type of the goods, services, location (e.g., delivering a package to a destination), and other user specified conditions specific to the order (e.g., risk/sensitivity of the goods). In one embodiment, the system maintains a database of services and related types of tests according to the requested service by the drone as a proof of the drone capability to carry out the requested said service. The database is further linked with growing knowledge graph according to previously carried out services, tests performed, and/or others. The system fetches context and type of the service from the database using the requested order payload.

An analytics engine 404 may include a plurality of machine learning algorithms (for example, algorithms such as visual analytics, deep learning, and statistical methods) trained using plurality of historical input data from one or more data sources (e.g., various voice data, image samples, crowdsourced location data, historical CAPTCHA challenges, responses, user supplied data). The analytics engine selects and configures one or more particular analytics models, which are trained by one or more machine learning algorithms, based on one or more of the classes of analytics to be performed at runtime. The analytics engine 404 may be used by a challenge generator 406 to guide the generation of a challenge by the drone CAPTCHA system, by the request analyzer 402 to analyze the request of the drone service, by the scoring engine 410 to guide the grading and/or scoring of a drone response to a CAPCHA challenge.

A challenge generator 406 generates a challenge, for example, by receiving a service request (e.g., in the form of an order) from a user or from another system-of-engagement (e.g., via mobile application), determining the type and context (e.g., including risk and/or sensitive level, location, weather) based on the requested service for a drone, and based on the determined type and context, triggering the CAPTCHA challenge generator. The generated challenge may be stored in a challenge database 414, for example, via the interface/communication manager 408.

The challenge generator 406 may send or present the challenge to the drone 420, for example, send a signal to the drone to perform the challenge. The signal may be sent via the interface/communication manager 408, which may communicate via the Internet or another network 418, for example, using a network protocol. The drone 420 receives the signal and attempts to perform the challenge.

The system receives information from the drone using interface/communication manager 408, the information indicating a response to the challenge, for example, the results the drone produced from performing the challenge.

A scoring engine 410 may score or grade the response, for instance, as described with reference to FIG. 2. The score or grade may also be stored in a database.

A decision engine 412 based on the response and the score may determine whether to allow or deny the drone from carrying out a function. For example, if the determined score of the response is below a defined threshold (or its performance does not pass the required performance threshold), the decision engine 412 may send an alert to the service requester user. In one example, the drone may have designated compartments with doors depending on service given by the drone (e.g., a drone for transporting refrigerated goods) and the decision engine 412 may send a signal to the drone door controller to lock the door opening logic in case the drone has failed the CAPTCHA challenge.

A drone 420 may include functional modules, which may execute on one or more hardware processors. An interface module 422 may facilitate the communication between the drone and other systems and devices (e.g., CAPTCHA system, remote system, beacon devices) as well as controlling the interfaces (e.g., the camera interface, audio interface, communication interface) of the drone system based on the context. A challenge interpreter module 424 may interpret the challenge received and actuate the drone to perform the challenge wherein the logic for interpreting the challenge may use the analytics engine, semantic and knowledge graph models stored on one or more databases. A secure context module 426 ensures the receiving of the CAPTCHA challenge and other communication (e.g., voice input) is from a trusted entity or service, for example, by using a security token. The security token is used to perform a handshake between the drone system and the CAPTCHA system, devices (e.g., beacon device, WiFi, mobile phone of a user) and other remote systems. Other services module 428 may include one or more standard drone services such as collision avoidance system, navigational system, imaging abilities, and/or others.

The method and system in one embodiment, for example, as described above provides a drone (e.g., UAV) with a "drone CAPTCHA", receives information from the drone that it has attempted to respond to the drone CAPTCHA, and based on the information received from the drone, the drone is permitted and/or facilitated to carry out a response. In one aspect, triggering the CAPTCHA is based on a request by the drone, for example, to pick up a package, perform an inspection inside a building or outside a building. As another example, triggering the CAPTCHA may be based on a location of a drone, a speed of a drone, or conditions associated with the drone.

The information received from the drone may be data related to the drone performing a flight maneuver (e.g., a quick up, down, back, forth, side, side movements), demonstrating speech recognition ability of a defined level (e.g., responding to several verbal commands), demonstrating collision avoidance abilities, navigation abilities, imaging abilities (e.g., including image resolution), the presence of an infrared (IR) camera (e.g., whether the drone is equipped with such device), engine horsepower, stabilization software and abilities when carrying a load, access to people or those in need, noise made at different engines speeds, and/or other information associated with the drone. Depending on the CAPTCHA sent to the drone, one or more of such information is received after the drone has attempted to the CAPTCHA. The CAPTCHA system is context dependent, for example, based on weather, rain, time of day (e.g., nighttime/daytime), and risk level associated with a given task the drone is to perform. A drone's response determined from the received information may be scored or graded. In one embodiment, the grade or score may be used to deploy drones to different tasks, in real-time. For example, a drone receiving an "A" rating may be deployed to pick up a fragile object, and a drone receiving a "C" rating may be considered for delivering a package of having a defined value and risk. Ratings may be catalogued; For example, "A" rating may be designated for performing a set of tasks; "B" rating may be designated for performing another set of tasks; and so forth. For instance, different types of material (whether e.g., perishable, biohazard, fragile) may be catalogued to different ratings. Permitting and/or facilitating may include allowing or controlling the drone to pick up a package (which may be perishable, a biohazard, a fragile item, and/or other), to fly to a location and/or providing the drone with further instructions, and/or others. The CAPTCHA process may be applied to more than one drone, e.g., a drone swarm. Different drones in a swarm may play different roles and also have different positions in a hierarchy of control (e.g., master, slave). Thus, different CAPTCHAs may be deployed to different drones in a swarm based on the role and hierarchy. In one aspect, the package itself may control or send the CAPTCHA. For example, a fragile package may have an RFID tag that specifies the CAPTCHA involve the drone flying in a figure-8 with a defined level of stability. The CAPTCHA system may read the RFID tag and generate a challenge based on the information contained in the RFID tag.

In one embodiment, a personalized trigger and test generator module may be implemented based on a custom specification (e.g., user-supplied requirements). The custom specification may take into consideration the destination location context (e.g., noisy location, large crowd presence, and/or others). This provides the users of drone CAPTCHA services more flexibility to customize based on specific requirements to intelligently test the drone's capabilities, for example, depending on individual need.

Figure 5:
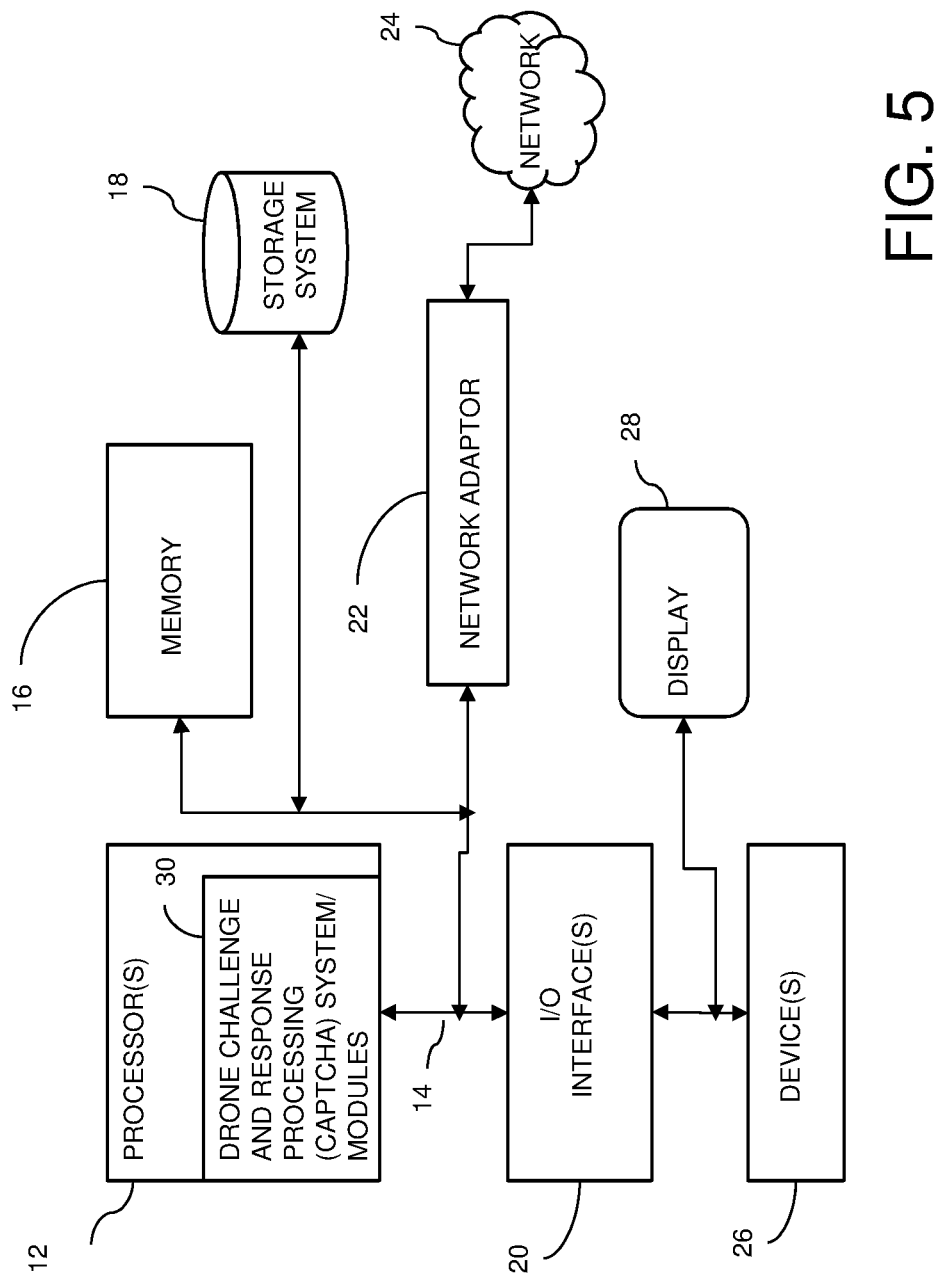
FIG. 5 illustrates a schematic of an example computer or processing system that may implement a drone challenge system in one embodiment of the present disclosure.

FIG. 5 illustrates a schematic of an example computer or processing system that may implement a drone challenge system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module(s) 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:
1. A method comprising:
receiving a request to determine a drone's capability;
determining a request type of the request and service context;
generating a challenge based on the request type and the service context;
presenting the challenge to a drone and causing the drone to attempt the challenge;
receiving information from the drone, the information indicating the drone's response to the challenge attempted by the drone; and
scoring the drone's response and based on the drone's response that is scored, the drone is permitted or not permitted to perform the given task.

2. The method of claim 1, wherein the request comprises a signal from a package the drone is to deliver to a destination location.

3. The method of claim 1, wherein the request is received by scanning an infrared (IR) tag coupled to a package associated with the given task.

4. The method of claim 1, wherein the challenge comprises performing a flight maneuver, demonstrating speech recognition ability to a defined level, demonstrating one or more of collision avoidance ability, navigation ability, imaging ability, engine horsepower capacity, stabilization ability during load carrying, access to people, noise levels at different engine speeds, or combinations thereof.

5. The method of claim 1, wherein the generated challenge is context dependent.

6. The method of claim 5, wherein the context comprises weather, time of day, and risk level associated with the given task.

7. A computer program product comprising a computer readable storage medium having program instructions embodied therewith, the program instructions executable by a device to cause the device to:
- receive a request to determine a drone's capability;
- determine a request type of the request and service context;
- generate a challenge based on the request type and the service context;
- present the challenge to a drone and causing the drone to attempt the challenge;
- receive information from the drone, the information indicating the drone's response to the challenge attempted by the drone; and
- score the drone's response and the drone is permitted or not permitted to perform the given task based on the score.

8. The computer program product of claim 7, wherein the request comprises a signal from a package the drone is to deliver to a destination location.

9. The computer program product of claim 7, wherein the request is received by scanning an infrared (IR) tag coupled to a package associated with the given task.

10. The computer program product of claim 7, wherein the challenge comprises performing a flight maneuver, demonstrating speech recognition ability to a defined level, demonstrating one or more of collision avoidance ability, navigation ability, imaging ability, engine horsepower capacity, stabilization ability during load carrying, access to people, noise levels at different engine speeds, or combinations thereof.

11. The computer program product of claim 7, wherein the generated challenge is context dependent.

12. The computer program product of claim 11, wherein the context comprises weather, time of day, and risk level associated with the given task.

13. A system comprising:
- at least one hardware processor;
- a memory device coupled to the at least on hardware processor;
- the at least one hardware processor operable to receive a request to determine a drone's capability;
- the at least one hardware processor operable to determine a request type of the request and service context;
- the at least one hardware processor operable to generate a challenge based on the request type and the service context and store the generated challenge in the memory device;
- the at least one hardware processor operable to present the challenge to a drone and causing the drone to attempt the challenge;
- the at least one hardware processor operable to receive information from the drone, the information indicating the drone's response to the challenge attempted by the drone; and
- the at least one hardware processor operable to score the drone's response and the drone is permitted or not permitted to perform the given task based on the score.

14. The system of claim 13, wherein the request comprises a signal from a package the drone is to deliver to a destination location.

15. The system of claim 13, wherein the request is received by scanning an infrared (IR) tag coupled to a package associated with the given task.

16. The system of claim 13, wherein the challenge comprises performing a flight maneuver, demonstrating speech recognition ability to a defined level, demonstrating one or more of collision avoidance ability, navigation ability, imaging ability, engine horsepower capacity, stabilization ability during load carrying, access to people, noise levels at different engine speeds, or combinations thereof.

17. The system of claim 13, wherein the generated challenge is context dependent.

18. The system of claim 17, wherein the context comprises weather, time of day, and risk level associated with the given task.

* * * * *